Patented Dec. 20, 1938

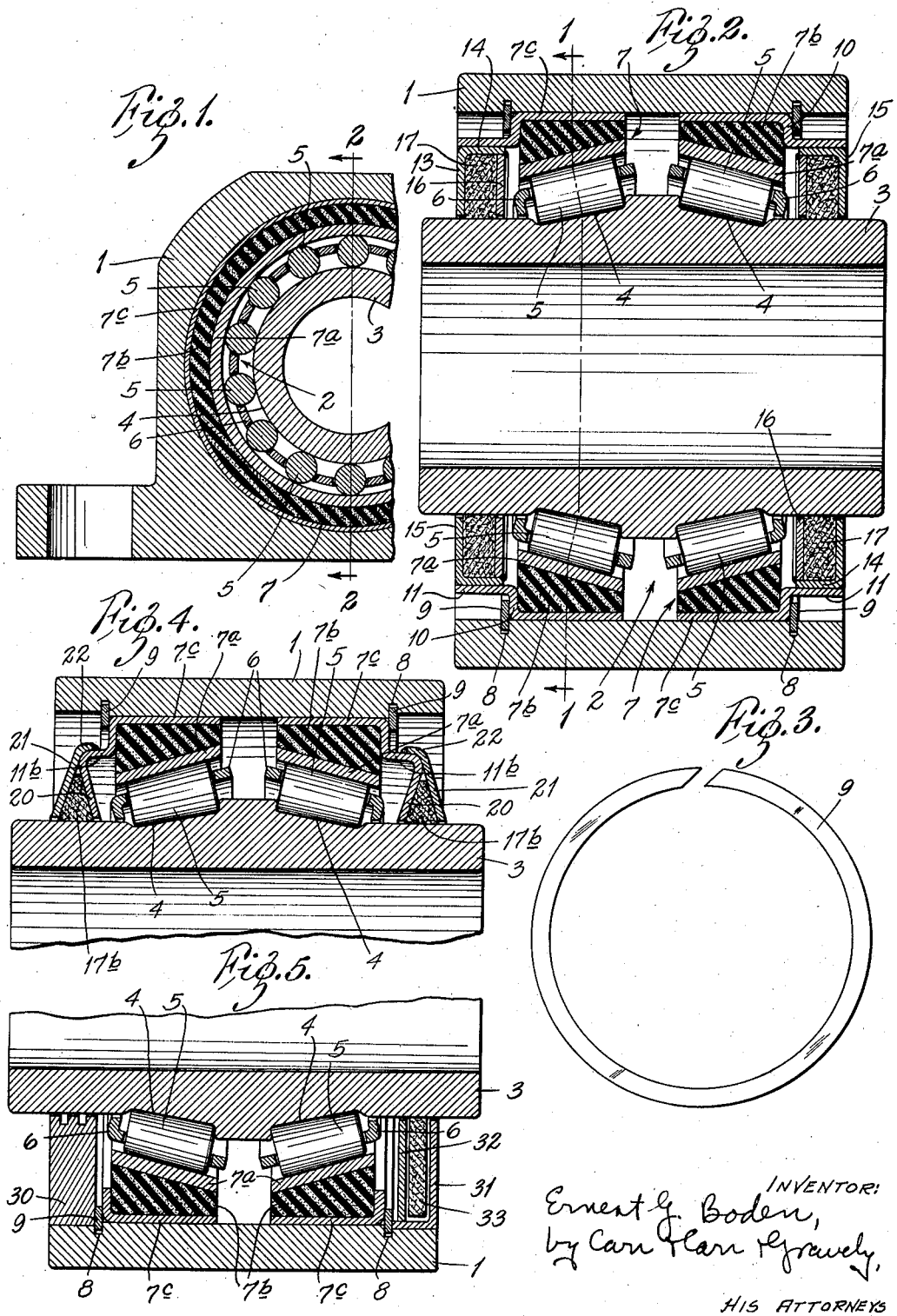

2,141,122

UNITED STATES PATENT OFFICE 2,141,122

CUSHIONED ROLLER BEARING

Ernest G. Boden, Canton, Ohio, assignor to The Timken Roller Bearing Company, Canton, Ohio, a corporation of Ohio Application December 22, 1937, Serial No. 181,058

7 Claims. (Cl. 308—184)

My invention relates to roller bearings, particularly taper roller bearings, and has for its principal object a means for permanent bearing preload and self-alinement. Another object is reduction of noise transmission and vibration.

The invention consists principally in providing the cup or outer bearing member with a core of rubber or other suitable resilient material. The invention further consists in the cushioned roller bearing and in the parts and combinations and arrangements of parts hereinafter described and claimed.

In the accompanying drawing,

Fig. 1 is a partial cross-sectional view on the line 1—1 in Fig. 2 of a cushioned roller bearing embodying my invention;

Fig. 2 is a longitudinal sectional view on an enlarged scale on the line 2—2 in Fig. 1;

Fig. 3 is a detail view of the split retaining ring for the outer bearing member;

Fig. 4 is a partial longitudinal sectional view similar to Fig. 2 showing a modification; and Fig. 5 is a partial longitudinal sectional view of another modification.

Fig. 1 illustrates a pillow block construction including a housing 1 or pedestal through which extends a shaft, not shown in the drawing, a roller bearing 2 being interposed between the housing 1 and the shaft. The present invention is concerned with a cushioned roller bearing adapted for use in such pillow block constructions as well as for general use.

In Fig. 2 is illustrated a double cone or inner bearing member 3 having conical raceways 4 that taper outwardly, an annular series of conical rollers 5 on each raceway, cages 6 for said rollers and a cushioned cup or outer bearing member 7 for each series of rollers mounted in the housing 1. The housing is provided with internal peripheral grooves 8 in each of which is mounted a split retaining ring 9 for engaging the end of a bearing cup 7 to hold it in position.

Each bearing cup comprises a conical raceway portion 7a of hardened steel or other suitable metal, a core 7b of rubber or other resilient material having a conical interior to fit the outer surface of said raceway portion 7a and a cylindrical outer periphery that is mounted in a cylindrical outer metal shell 7c. Said outer metal shell 7c has an inturned radially disposed flange 10 engaging the end face of the rubber core 7b and stopping short of the raceway shell 7a to allow for bulging of the rubber. From the inner periphery of said radial flange 10 extends an axial sleeve 11. The radial flange 10 of each cup 7 is engaged by one of said retaining rings 9.

The axial sleeve 11 or skirt portion of the outer shell 7c affords a mounting for a closure member which may be pressed into said sleeve. The particular closure member indicated comprises an angular ring 13 having an axially extending flange 14 mounted in said sleeve 11 and a radial flange 15 at the outermost end of said axial flange. A ring or washer 16 is mounted in the innermost end of said axial flange 14 and fixed thereto, a suitable packing 17 being disposed between the radial ring 16 and the radial flange 15 of the angular ring 13.

In the modification shown in Fig. 4, the sleeve portion 11b of the outer shell has a conical flange 20 at its outermost end that is dished inwardly towards the bearing. A cooperating conical washer 21 is dished in the opposite direction and has a peripheral flange 22 welded to said sleeve portion 11b. In the V-shaped space between said flange 20 and said washer 21 is disposed a suitable packing 17b.

In the modification shown in Fig. 5, the axial sleeve portion of the flange 10 of the metal shell 7c is omitted. With this bearing, the closure is inserted in the housing 1. At one end of Fig. 5, the closure is shown as a single ring 30. At the other end, the closure comprises an angular ring 31 in the housing, a ring 32 in the peripheral flange of said angular ring and a washer 33 on the inner bearing member disposed between said rings.

The cup 7 may be so proportioned that considerable endwise pressure on the rubber 7b is required to so position the cup that the end flange of the outer shell is held within the retaining ring, thus preloading the bearing. The rubber under compression automatically takes up wear in the bearing, compensates for misalinement of the cup seats, makes the bearing entirely self-alining, both radially and axially and increases the fatigue life of the bearing by reason of the rubber taking up shock and the self-alinement of the bearing reducing roller end loading or localized stress. The hardness of the rubber or resilient material can be varied as required. The bearing is easily assembled, various adjusting and positioning devices of ordinary bearing mountings being dispensed with. The bearing is well adapted for many other uses than the pillow block mounting illustrated.

Obviously numerous changes may be made without departing from the invention and I do not wish to be limited to the precise construction shown.

What I claim is:

1. A double row roller bearing construction comprising a double inner bearing cone with outwardly tapering raceways, tapered bearing rollers on the respective raceways, a bearing cup for each series of rollers, each cup comprising a metal raceway portion, a metal outer shell and an intermediate resilient core, said outer shell having an inwardly extending radial flange at its outermost end overlapping the end face of said resilient core, a housing in which said bearing cups are mounted, said housing having annular grooves around its inner periphery near each end and retaining rings in said grooves for holding said cups in said housing in a preloaded condition.

2. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, said outer shell having an inwardly disposed radial flange at its outermost end engaging the end of said core and an axially disposed annular sleeve projecting from the inner periphery of said radial flange and a bearing sealing member secured to said sleeve portion of said shell.

3. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, a retaining ring holding said cup in said housing, said outer shell having an inwardly disposed radial flange at its outermost end engaging the end of said core and an axially disposed annular sleeve projecting from the inner periphery of said radial flange and a bearing sealing member secured to said sleeve portion of said shell.

4. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, said outer shell having an inwardly disposed radial flange at its outermost end engaging the end of said core and an axially disposed annular sleeve projecting from the inner periphery of said radial flange and a bearing sealing member mounted in said sleeve portion of said shell.

5. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, said outer shell having an inwardly disposed radial flange at its outermost end engaging the end of said core and an axially disposed annular sleeve projecting from the inner periphery of said radial flange, an angular ring having an axial flange mounted in said sleeve and an inwardly extending radial flange at the outermost end of said sleeve, a washer secured in the innermost end of said axial flange and a packing in the space between said axial flange, said radial flange and said washer.

6. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, said outer shell having an inwardly disposed radial flange at its outermost end engaging the end of said core, an axially disposed annular sleeve projecting from the inner periphery of said radial flange, and an inwardly extending conical flange at the end of said sleeve portion and a conical flange cooperating with said previously mentioned conical flange and having a peripheral flange secured to said sleeve portion of said shell.

7. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, a retaining ring holding said cup in said housing, said outer shell having an inwardly disposed radial flange at its outermost end engaging the end of said core, an axially disposed annular sleeve projecting from the inner periphery of said radial flange and an inwardly extending conical flange at the end of said sleeve portion and a conical flange cooperating with said previously mentioned conical flange and having a peripheral flange secured to said sleeve portion of said shell.

ERNEST G. BODEN.